US006903867B2

(12) United States Patent
Ng et al.

(10) Patent No.: US 6,903,867 B2
(45) Date of Patent: Jun. 7, 2005

(54) METHOD AND APPARATUS FOR GAIN EXCURSION MINIMIZATION IN AUTOMATIC GAIN CONTROLLED OPTICAL SYSTEMS

(75) Inventors: Eddie Kai Ho Ng, Ottawa (CA); Ping Wai Wan, Ottawa (CA); Derrick Remedios, Ottawa (CA); Robert Michael Bierman, Ottawa (CA); Dung Van Nguyen, Ottawa (CA)

(73) Assignee: Tropic Networks Inc., Kanata (CA)

( * ) Notice: Subject to any disclaimer, the term of this patent is extended or adjusted under 35 U.S.C. 154(b) by 307 days.

(21) Appl. No.: 10/195,495

(22) Filed: Jul. 16, 2002

(65) Prior Publication Data

US 2003/0133182 A1 Jul. 17, 2003

Related U.S. Application Data

(60) Provisional application No. 60/348,612, filed on Jan. 17, 2002, and provisional application No. 60/354,025, filed on Feb. 5, 2002.

(51) Int. Cl.[7] .............................................. H01S 3/00
(52) U.S. Cl. ................................................. 359/341.41
(58) Field of Search ............................ 398/37, 16, 31; 359/341.41

(56) References Cited

U.S. PATENT DOCUMENTS

| 6,091,541 | A | * | 7/2000 | Yoon ..................... 359/341.41 |
| 6,320,694 | B1 | * | 11/2001 | Ohshima ................ 359/341.33 |
| 6,483,630 | B2 | * | 11/2002 | Kosaka .................. 359/337.11 |
| 6,599,039 | B1 | * | 7/2003 | Nakazato ..................... 398/25 |

FOREIGN PATENT DOCUMENTS

WO  WO 01 01611 A 2   1/2001   .......... H04B/10/00

OTHER PUBLICATIONS

Tomlinson, W.J., "Dynamic Gain Equalization for Next-Generation DWDM Transport Systems", Digest of LEOS Topical Meetings, Paper WD1.1 (2001).
Patent Abstracts of Japan, vol. 2000, No. 22, Mar. 9, 2001 & JP 2001 144352 A (Sumitomo Electric Ind. Ltd), May 25, 2001—abstract.

(Continued)

Primary Examiner—Thomas H. Tarcza
Assistant Examiner—Deandra M. Hughes
(74) Attorney, Agent, or Firm—Victoria Donnelly

(57) ABSTRACT

An apparatus and method for minimizing channel gain excursion in an optical system with automatic gain control is provided. The apparatus includes a feedback control loop which dynamically regulates the target gain of an automatic gain controlled (AGC) amplifier so as to compensate for the action of the AGC amplifier to maintain a constant linear average gain without accounting for the distribution of channels that carry signals across the amplifier spectral gain profile, which causes gain excursion of individual channels. The feedback control loop measures gain of individual channels and uses these measurements to regulate the target gain of the amplifier so as to minimize gain excursion of individual channels. If required, the apparatus may be integrated into a package. In one embodiment, the method for regulating the target gain is to maintain constant gain for all channels irrespective of the number of channels that carry a signal. This method is simple and guarantees no gain excursion. In another embodiment, a weight is assigned to an individual channel to calculate a weighted average for the target gain of the amplifier while attempting to minimize gain excursion of individual channels.

26 Claims, 4 Drawing Sheets

OTHER PUBLICATIONS

Srivastava, A.K., et al, "Optical Amplifiers for Optical Networks", Vertical–Cavity Lasers, Technologies for a Global Information Infrastructure, WDM Components Technology, Advanced Semiconductor Lasers and Applications, Gallium Nitride Materials, Processing, and Devices, 1997 Digest of the IEEE/LEOS, Summer, Topical M, Aug. 11, 1997, pp. 74–75, XP010243214, ISBN: )–7803–3891–X, the whole document.

Sugaya, Y., et al, "In–Service–Upgradable and Wide–Dynamic–Range Split–Band Optical Fibre Amplifier for High Capacity Broadband WDM Transmission Systems", Electronics Letters, IEE Stevenage, GB, vol. 35, No. 16, Aug. 5, 1999, pp. 1361–1362, XP006012527, ISSN, 0013–5194, the whole document.

* cited by examiner

METHOD AND APPARATUS FOR GAIN EXCURSION MINIMIZATION IN AUTOMATIC GAIN CONTROLLED OPTICAL SYSTEMS

This application claims benefit of provisional patent application to Eddie Ng entitled "Optical Amplifier Channel Gain Excursion Optimization Methods in Broadband Optical Amplifiers" Ser. No. 60/348,612 filed on Jan. 17, 2002, and provisional patent application to Eddie Ng entitled "Optical Amplifier Channel Gain Excursion Optimization Methods in Broadband Optical Amplifiers", Ser. No. 60/354,025 filed on Feb. 5, 2002.

FIELD OF THE INVENTION

The present invention relates generally to optical amplifiers, and in particular to gain excursion minimization (GEM) techniques for optical amplifiers that employ automatic gain control (AGC).

BACKGROUND OF THE INVENTION

Optical amplifiers are widely used in optical networks to extend the reach of optical systems by compensating for line and device losses. A signal passing through the active medium of an optical amplifier is amplified by a channel gain factor dependant both on the pump laser power and the total number of channels that carry a signal passing through the amplifier. The number of channels that carry a signal to be amplified in the network may change due to network upgrades, dynamic reconfigurations, and channel failures.

Currently, automatic gain control (AGC) compensates for variations in amplifier channel gain due to changes in the number of channels that carry a signal by monitoring the total input and total output power of the amplifier and adjusting pump laser power to maintain a constant average gain. However, because only total input and output powers are monitored, as opposed to the powers of individual channels, the gain of individual channels cannot be monitored or controlled.

An article by W. J. Tomlinson entitled "Dynamic Gain Equalization for Next-Generation DWDM Transport Systems" published in the Digest of LEOS Topical Meetings, Paper WD 1.1 (2001), describes the use of high-resolution dynamic gain equalizers (DGEs) for dynamic gain control on a per-channel basis. However, since DGEs are capable only of attenuating and not amplifying, they can only compensate for excess gain and not for insufficient gain. Additionally, the use of DGEs in metropolitan and regional area networks is unwelcome because of the associated capital and operational costs. Finally, the increased losses introduced by DGEs may necessitate additional optical amplifiers, which increases costs and degrades optical signal to noise ratio (OSNR).

Therefore, there is a need in industry for the development of alternative solutions for monitoring and controlling the gain of an amplifier in an optical system, which would include monitoring of individual channels and would be simple and cost-efficient.

SUMMARY OF THE INVENTION

Therefore there is an object of the invention to provide a method and system for controlling the gain of an amplifier to provide gain excursion minimization (GEM) in an optical system.

According to one aspect of the invention there is provided a method for monitoring and controlling an optical amplifier, comprising the steps of:

determining a gain of an optical channel of the plurality of optical channels to be amplified in the amplifier;

selecting a sub-set of optical channels from the plurality of optical channels; and dynamically regulating a target gain of the amplifier in response to the changes of the gain of said optical channel of the plurality of optical channels so as to provide that the gain for each optical channel from the selected sub-set of channels is within a predetermined range.

The step of selecting may comprise selecting the sub-set of channels including one channel only. Alternatively, the step of selecting may comprise selecting the sub-set of channels which includes all channels of the plurality of channels to be amplified.

The step of dynamically regulating the target gain of the amplifier may comprise defining the predetermined range as a gain ripple $\Delta$ of the amplifier, the gain ripple $\Delta$ being a variation of the amplifier gain profile within a range of wavelengths to be amplified, e.g. within a band of wavelengths to be amplified.

In the method of the first embodiment of the invention, the step of dynamically regulating the target gain of the amplifier further comprises:

(a) identifying an optical channel over the band of wavelengths that carries a signal and has the lowest gain; and (b) changing the target gain of the amplifier so as to provide that the gain of said channel is substantially equal to the following value $G_{ripple\ min} = G_0 - \Delta/2$, wherein $G_0$ is an original target gain of the amplifier.

If required, the step (b) of the above method may comprise changing the target gain so as to provide that the gain of said channel is equal to $G_{ripple\ min}$.

Additionally, the method may further comprise the following steps:

(c) identifying all optical channels over the band of wavelengths that carry a signal;

(d) calculating an average gain $G_{avg}$ of said channels that carry a signal;

(e) calculating a gain difference: $G_{diff} = G_{ripple\ min} - G_{min\ sig}$, wherein $G_{min\ sig}$ is the gain of the channel that carries a signal and has the lowest gain, the steps (c), (d), and (e) being performed before step (b); and wherein the step (b) comprises the step of (f) changing the target gain of the amplifier so as to be substantially equal the following value: $G_{target} = G_{avg} + G_{diff}$.

If required, the step (f) of the above method may comprise changing the target gain so as to be equal to $G_{target}$.

In a modification to the method of the first embodiment of the invention, the step of dynamically regulating the target gain of the amplifier further comprises:

(a) identifying an optical channel over the band of wavelengths that has the lowest gain;

(b) identifying an optical channel over the band of wavelengths that carries a signal;

(c) calculating a gain difference: $G_{diff} = G_{sig} - G_{min\ gain}$ wherein $G_{min\ gain}$ is the channel that has the lowest gain and $G_{sig}$ is the channel that carries a signal identified in (b); and (d) changing the target gain of the amplifier so as to provide that the gain of the channel that carries a signal is substantially equal to the following value:

$G_{recalculated} = G_0 - \Delta/2 + G_{diff}$, wherein $G_0$ is an original target gain of the amplifier.

If required, the step (d) of the above method may comprise changing the target gain so as to provide that the gain of said channel is equal to $G_{recalculated}$.

Additionally, the method may further comprise the following steps:

(e) identifying all optical channels over the band of wavelengths that carry a signal;

(f) calculating an average gain $G_{avg}$ of said channels;

(g) calculating a gain difference $\tilde{G}_{diff}=G_{recalculated}-G_{stg}$, the steps (e), (f), and (g) being performed before step (d); and wherein the step (d) comprises the step of (h) changing the target gain of the amplifier so as to be substantially equal to the following value: $G_{target}=G_{avg}+\tilde{G}_{diff}$.

If required, the step (h) of the above method may comprise changing the target gain so as to be equal to $G_{target}$.

In the method of the second embodiment of the invention, the step of dynamically regulating the target gain of the amplifier further comprises:

identifying all optical channels over the band of wavelengths that carry a signal, including determining the number of said channels $N_{populated\ channels}$ and determining the gains $g_i$ for each of said channels;

calculating weights $w_i$ for said channels, such that $$\sum_{1}^{N_{ch}} w_i = 1,$$

wherein $N_{ch}$ is the total number of optical channels to be amplified by the amplifier; and changing the target gain of the amplifier so as to be substantially equal to the following value:

$$G_{weighted\ avg} = \left[\sum_{i=signal\ channels} g_i \cdot w_i\right] \frac{N_{ch}}{N_{signal\ channels}},$$

wherein $N_{ch}$ is the total number of optical channels to be amplified by the amplifier.

If required, the step above of changing the target gain may comprise changing the target gain so as to be equal to $G_{weighted\ average}$.

In a modification to the method of the second embodiment, the step of dynamically regulating the target gain of the amplifier further comprises:

identifying all optical channels over the band of wavelengths that carry a signal, including determining the gains $g_i$ for each of said channels and calculating a weights $w_i$ of said channels; and changing the target gain of the amplifier so as to be substantially equal to the following value:

$$\tilde{G}_{weighted\ avg} = \left[\sum_{i=signal\ channels} g_i \cdot \tilde{w}_i\right],$$

wherein $$\tilde{w}_i = \frac{w_i}{\sum_{k=signal\ channels} w_k}$$

such that $$\sum_{i=signal\ channels} \tilde{w}_i = 1.$$

If required, the step above of changing the target gain may comprise changing the target gain so as to be equal to $\tilde{G}_{weighted\ avg}$.

Additionally the step of calculating the weights may comprise the following steps:

sorting the optical channels over the band of wavelengths by ascending gain to form an ascending gain profile, which has an ascending channel order as its argument;

sorting the optical channels over the band of wavelengths by descending gain to form a descending gain profile, which has a descending channel order as its argument;

normalizing the descending gain profile such that $$g'_i = \frac{g_i}{\sum g_i};$$

and forming a weight profile as the normalized descending gain profile in which the ascending channel order is used as its argument; and determining the weights for the channels from by the weight profile.

Additionally the above method may further comprise the following steps:

calculating an average $w_{avg}$ of the weights;

calculating a center wavelength $\lambda_c$ in the band of wavelengths;

multiplying the weights by the following weight-adjusting function:

$f(\lambda)=c(\lambda-\lambda_c)+w_{avg}$, wherein c is a negative constant for adjusting the weight distribution; and normalizing the weights such that $$\sum_{1}^{N_{ch}} w_i = 1.$$

According to another aspect of the invention there is provided a method for monitoring and controlling an optical link, comprising the steps of:

determining a gain of an optical channel of the plurality of optical channels to be carried by the optical link;

selecting a sub-set of optical channels from the plurality of optical channels; and dynamically regulating a target gain for the optical link in response to the changes of the gain of said optical channel of the plurality of optical channels so as to provide that the gain for each optical channel from the selected sub-set of channels is within a predetermined range.

According to another aspect of the invention there is provided an apparatus for monitoring and controlling performance of an optical network, comprising:

an amplifier for amplifying a plurality of optical channels, the amplifier having an input and an output;

an input channel power monitor for monitoring an input power of an optical channel at the input of an amplifier;

an output channel power monitor for monitoring an output power of said optical channel at the output of the amplifier; and a controller having means for receiving data from the input and output channel power monitors and means for dynamically regulating a target gain of the amplifier in response to said data so as to provide that a gain for each channel within a selected sub-set of channels out of the plurality of channels to be amplified is within a predetermined range.

Alternatively, the means for dynamically regulating the target gain may provide that a gain for one channel only is not exceeding the predetermined range. Additionally, the means for dynamically regulating the target gain may define the predetermined range as a gain ripple of the amplifier, the gain ripple $\Delta$ being a variation of the amplifier gain within a range of wavelengths to be amplified, e.g. within a band of wavelengths to be amplified. If required, the apparatus may be integrated into a package, either alone or with other opto-electronic components.

In the apparatus of the first embodiment, the means for dynamically regulating the target gain comprises:

(a) means for identifying an optical channel over the band of wavelengths that carries a signal and has the lowest gain; and (b) means for changing the target gain of the amplifier so as to provide that the gain of said channel is substantially equal to the following value: $G_{ripple\ min}=G_0-\Delta/2$, wherein $G_0$ is an original target gain of the amplifier.

If required, the means (b) for changing the target gain may provide that the gain of said channel is equal to $G_{ripple\ min}$.

Additionally, the apparatus may further comprise:

(c) means for identifying all optical channels over the band of wavelengths that carry a signal;

(d) means for calculating an average gain $G_{avg}$ of said channels that carry a signal;

(e) means for calculating a gain difference: $G_{diff}=G_{ripple\ min}-G_{min\ sig}$, wherein $G_{min\ sig}$ is the gain of the channel that carries a signal and has the lowest gain; and wherein the means (b) for changing the target gain further comprises means (f) for changing the target gain of the amplifier so as to be substantially equal to the following value: $G_{target}=G_{avg}+G_{diff}$.

If required, the means (f) for changing the target gain may provide that the target gain is equal to $G_{target}$.

In a modification to the apparatus of the first embodiment of the invention, the means for dynamically regulating the target gain comprises:

(a) means for identifying an optical channel over the band of wavelengths that has the lowest gain;

(b) means for identifying an optical channel over the band of wavelengths that carries a signal;

(c) means for calculating a gain difference: $G_{diff}=G_{sig}-G_{min\ gain}$, wherein $G_{min\ gain}$ is the channel that has the lowest gain and $G_{sig}$ is the channel that carries a signal identified in (b); and (d) means for changing the target gain of the amplifier so as to provide that the gain of the channel that carries a signal is substantially equal to the following value: $G_{recalculated}=G_0-\Delta/2+G_{diff}$, wherein $G_0$ is an original target gain of the amplifier.

If required, the means (d) for changing the target gain may provide that the gain of said channel is equal to $G_{recalculated}$.

Additionally, the apparatus may further comprise:

(e) means for identifying all optical channels over the band of wavelengths that carry a signal;

(f) means for calculating an average gain $G_{avg}$ of said channels;

(g) means for calculating a gain difference: $\tilde{G}_{diff}=G_{recalculated}-G_{sig}$; and wherein the means (d) for changing the target gain further comprises means (h) for changing the target gain of the amplifier so as to be substantially equal to the following value: $G_{target}=G_{avg}+\tilde{G}_{diff}$.

If required, the means (h) for changing the target gain may provide that the target gain is equal to $G_{target}$.

In a second embodiment of the apparatus, the means for dynamically regulating the target gain comprises:

means for identifying all optical channels over the band of wavelengths that carry a signal, including means for determining the number of said channels $N_{populated\ channels}$ and means for determining the gains $g_i$ for each of said channels;

means for calculating weights $w_i$ for said channels, such that $$\sum_{1}^{N_{ch}} w_i = 1,$$

wherein $N_{ch}$ is the total number of optical channels to be amplified by the amplifier; and means for changing the target gain of the amplifier so as to be substantially equal to the following value:

$$G_{weighted\ avg} = \left[\sum_{i=populated\ channels} g_i \cdot w_i\right] \frac{N_{ch}}{N_{populated\ channels}},$$

wherein $N_{ch}$ is the total number of optical channels to be amplified by the amplifier.

If required, the means for changing the target gain may provide that the target gain is equal to $G_{weighted\ average}$.

In a modification to the apparatus of the second embodiment of the invention, the means for dynamically regulating the target gain further comprises:

means for identifying all optical channels over the band of wavelengths that carry a signal including means for determining the gains $g_i$ for each of said channels and means for calculating weights $w_i$ of said channels; and means for changing the target gain of the amplifier so as to be substantially equal to the following weighted-average gain value:

$$\tilde{G}_{weighted\ avg} = \left[\sum_{i=signal\ channels} g_i \cdot \tilde{w}_i\right]$$

wherein $$\tilde{w}_i = \frac{w_i}{\sum_{k=signal\ channels} w_k}$$

such that $$\sum_{i=signal\ channels} \tilde{w}_i = 1.$$

If required, the means for changing the target gain may provide that the target gain is equal to $\tilde{G}_{weighted\ avg}$.

Additionally, the means for calculating weights may comprise:

means for sorting the optical channels over the band of wavelengths by ascending gain to form an ascending gain profile, which has an ascending channel order as its argument;

means for sorting the optical channels over the band of wavelengths by descending gain to form a descending gain profile, which has a descending channel order as its argument;

means for normalizing the descending gain profile such that $$g'_i = \frac{g_i}{\sum g_i};$$

and means for forming a weight profile as the normalized descending gain profile in which the ascending channel order is used as its argument and for determining the weights for the channels from by the weight profile.

Additionally, the above means for calculating the weights may further comprise:

means for calculating an average $w_{avg}$ of the weights;

means for calculating a center wavelength $\lambda_c$ in the band of wavelengths;

means for multiplying the weights by the following weight-adjusting function: $f(\lambda)=c(\lambda-\lambda_c)+w_{avg}$, wherein c is a negative constant for adjusting the weight distribution; and means for normalizing the weights such that $$\sum_1^{N_{ch}} w_i = 1.$$

According to one more aspect of the invention there is provided an apparatus for monitoring and controlling an optical amplifier, comprising the steps of:

means for determining a gain of an optical channel of the plurality of optical channels to be amplified in the amplifier;

means for selecting a sub-set of optical channels from the plurality of optical channels; and a controller for dynamically regulating a target gain of the amplifier in response to the changes of the gain of said optical channel of the plurality of optical channels so as to provide that the gain for each optical channel from the selected sub-set of channels is within a predetermined range.

According to yet one more aspect of the invention there is provided a controller for controlling an optical amplifier having an input and an output, comprising:

means for receiving data from channel power monitors at the input and output of the amplifier and means for dynamically calculating a target gain value for the optical amplifier in response to changes in said data so as to provide that the gain for each channel within a selected sub-set of channels out of a plurality of channels to be amplified in the amplifier is within a predetermined range.

According to yet one more aspect of the invention there is provided an apparatus for monitoring and controlling an optical link, comprising:

means for determining a gain of an optical channel of the plurality of optical channels to be carried by the optical link;

means for selecting a sub-set of optical channels from the plurality of optical channels; and means for dynamically regulating a target gain for the optical link in response to the changes of the gain of said optical channel of the plurality of optical channels so as to provide that the gain for each optical channel from the selected sub-set of channels is within a predetermined range.

The methods and systems for controlling an optical amplifier of the embodiments of the invention provide simple and cost-efficient control of the performance of optical systems while minimizing or eliminating gain excursion for individual channels.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

Figure 1:
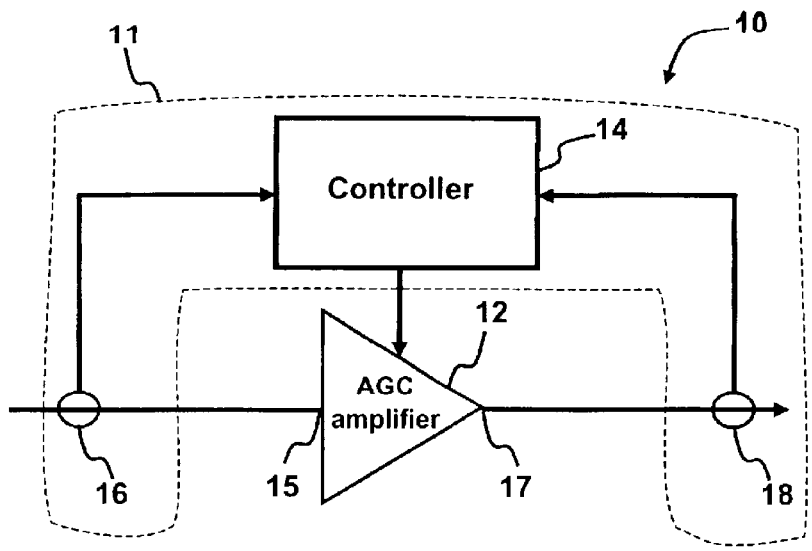
FIG. 1 is a diagram illustrating the apparatus for monitoring and controlling an optical amplifier according to the first and second embodiments of the invention.

An apparatus 10 for controlling an optical amplifier, used in embodiments of the invention, is shown in FIG. 1. It includes a commercially available amplifier 12, having an input 15 and output 17 and a conventional automatic gain control (AGC), or level one control loop, augmented by a higher level feedback control loop 11. The higher level feedback control loop 11 includes a controller 14 and an input and output channel power monitors 16 and 18 at the input 15 and the output 17 of the amplifier respectively, the controller dynamically regulating the target gain of the amplifier so as to minimize gain excursion of individual channels.

A definition of gain excursion is provided below.

The conventional AGC compensates for variations in the amplifier gain by adjusting pump laser power to maintain a constant average gain through all channels that carry a signal. Due to the linear summing nature of photodetectors, it is the arithmetic average gain that is regulated to the level of the target gain. However optical amplifiers have gain profiles that vary with wavelength. The variation of the gain profile over the band of wavelengths to be amplified is specified as amplifier gain ripple. This amplifier gain ripple affects the AGC so that a large gain deviation on an individual channel can be created with an unbalanced distribution of channels because each channel is treated equally when calculating the arithmetic average gain. When this deviation in gain of an individual channel exceeds specified maximum amplifier gain ripple, it is referred to as gain excursion.

Figure 2A:
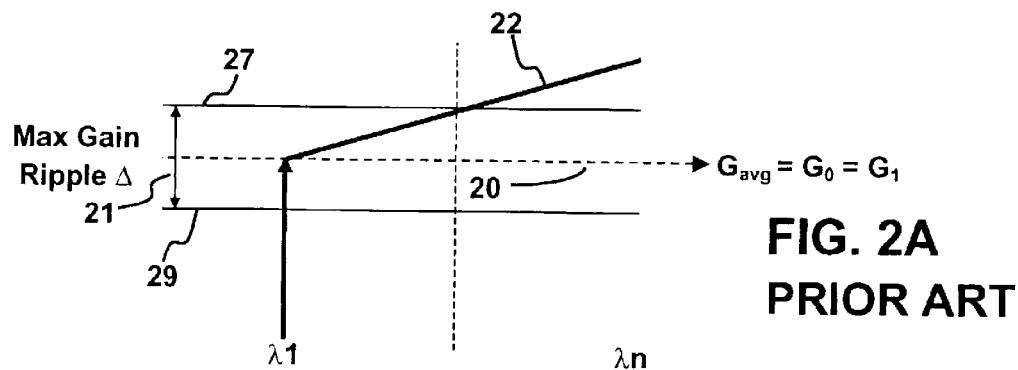
FIG. 2 illustrates the development of gain excursion for channel $\lambda_1$ within a band of channels $\lambda_1$ to $\lambda_n$ amplified in an amplifier of the prior art having a linear gain ripple as the number of channels that carry a signal increase.
Figure 2B:
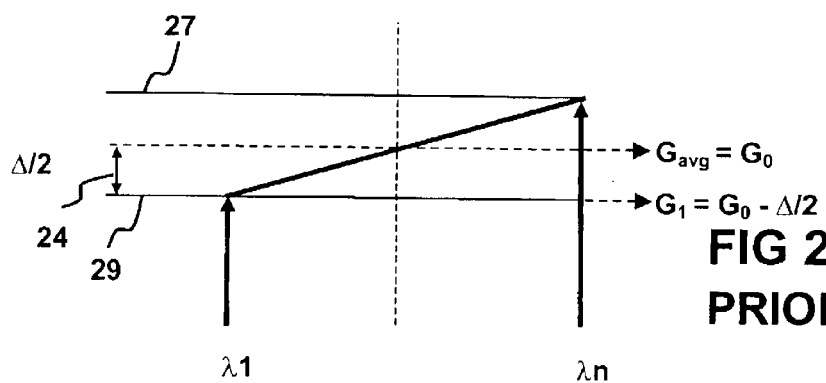
Figure 2C:
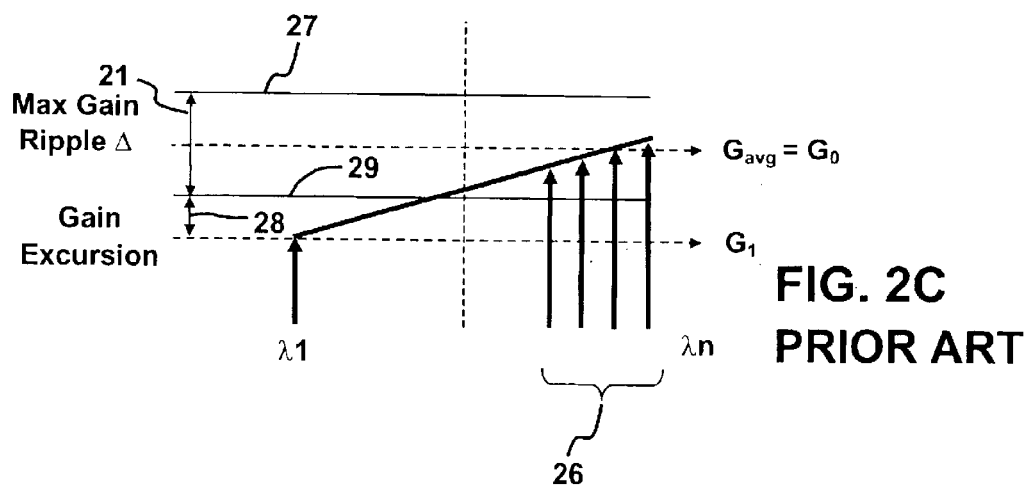

The definition of gain excursion will be explained in more detail with the aid of FIGS. 2A to 2C, which illustrate the development of gain excursion for channel $\lambda_1$ within a band of channels $\lambda_1$ to $\lambda_n$ amplified in the amplifier 12 of the prior art as the number of channels that carry a signal increase. For simplicity, the amplifier is chosen to have a linear gain ripple dependency 22 with a maximum gain ripple $\Delta$ designated by reference numeral 21 in FIGS. 2A to 2C. In FIG. 2A, the low boundary of the gain ripple 21 is represented by a solid line designated by the reference numeral 29, and the high boundary of the gain ripple 21 is represented by a solid line designated by reference numeral 27.

Initially, when only the lowest gain channel $\lambda_1$ carries a signal, the average gain $G_{avg}$ and the channel gain $G_1$ of the channel $\lambda_1$ are set equal by the AGC to the target gain $G_0$ 20 of the amplifier as shown in FIG. 2A. As a second channel starts to carry a signal (e.g. channel $\lambda_n$ as shown in FIG. 2B), in order to maintain the average gain $G_{avg}$ of the channels that carry a signal at the same target gain $G_0$ of the amplifier, the gain $G_1$ of the channel $\lambda_1$ has to be decreased. In this particular example it is decreased by $\Delta/2$ 24, wherein $\Delta$ is the maximum gain ripple of the amplifier. As more channels at the higher gain end of the spectrum 26 start to carry a signal as shown in FIG. 2C, the average gain $G_{avg}$ increases, and the AGC of the amplifier will adjust pump laser power until the average gain $G_{avg}$ for all channels that carry a signal and the target gain $G_0$ of the amplifier coincide again. This will result in further decrease of the gain of the channel $\lambda_1$, which may eventually fall beyond the gain ripple $\Delta$, the effect being referred to as gain excursion 28 for the channel $\lambda_1$. The value of gain excursion for a channel $\lambda_1$ is measured as the difference between the low boundary 29 of gain ripple (i.e. $G_0-\Delta/2$) and the gain $G_1$ of the channel $\lambda_1$, which is $G_0-\Delta/2-G_1$. Thus, the value of gain excursion 28 for the channel $\lambda_1$ in FIG. 2C is the difference between the low boundary 29 of the gain ripple (i.e. $G_0-\Delta/2$) and the gain $G_1$ of the channel $\lambda_1$, which is $G_0-\Delta/2-G_1$.

Figure 3:
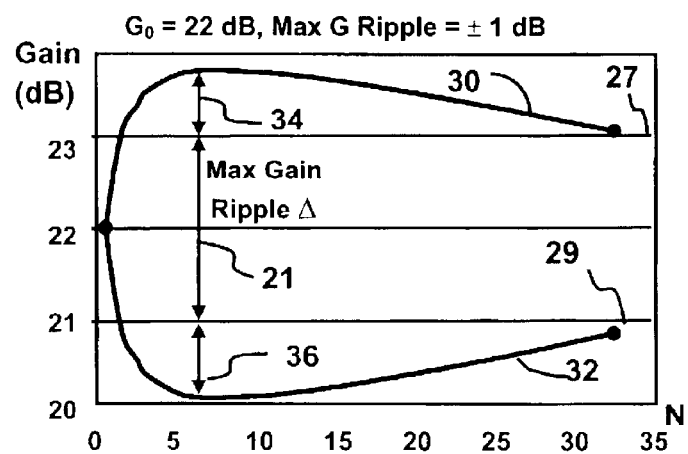
FIG. 3 illustrates a dependence of gain of two individual channels versus the number of channels that carry a signal in the prior art apparatus for controlling an amplifier under conditions causing maximal gain excursion for the channel.

FIG. 3 further illustrates the effect of gain excursion. In FIG. 3 is shown a dependence of gain of two individual channels versus the number of channels N that carry a signal in the prior art apparatus for controlling an amplifier under conditions causing maximal gain excursion for the channel. In the example of FIG. 3, the prior art apparatus carries 32 channels (n=32), and has a amplifier target gain $G_0$ of 22 dB and a linear amplifier gain ripple of ±1 dB as depicted in FIG. 2. Maximal gain excursion occurs for the highest gain channel $\lambda_{32}$ and the for lowest gain $\lambda_1$ channel under the following conditions: channel 32 $\lambda_{32}$ 30 experiences the maximal gain excursion 34 above +1 dB ripple when it is the first channel to carry a signal and the order in which other channels start to carry a signal is from the lowest gain $\lambda_1$ up to the highest gain 132 Channel 1 ($\lambda_i$) 32 experiences the maximal gain excursion 36 below −1 dB ripple when it is the first channel to carry a signal and the order in which other channels start to carry a signal is from the highest gain $\lambda_{32}$ down to the lowest gain $\lambda_2$. Thus, FIG. 3 is a plot illustrating a maximal gain excursion, and plots illustrating gains of all other channels and other orders in which channels start to carry signals will not exceed these two maximal gain excursion curves 30 and 32.

So, the cause of gain excursion is the action of the AGC of the amplifier 12 to maintain constant arithmetic average gain without accounting for the distribution of the channels that carry a signal across a non-constant amplifier spectral gain profile.

An apparatus 10 for controlling an optical amplifier, used in the embodiments of the invention and shown in FIG. 1 operates as follows. The amplifier with AGC 12 includes internal power monitors that determine average gain from the ratio of the total output and input powers to the amplifier. Pump laser power is regulated by the AGC to maintain average gain at a fixed amplifier target gain value. A higher level feedback control loop 11 uses the measurements of the input and input channel powers from the input and output channel power monitors 16 and 18 respectively to determine channel gains as the ratio of the output and input channel powers. The higher level feedback control loop 11 dynamically supplies the automatic gain controlled amplifier with a target gain value calculated by the controller 14 according to the methods of the embodiments of the invention as will be described in detail below.

Figure 4:
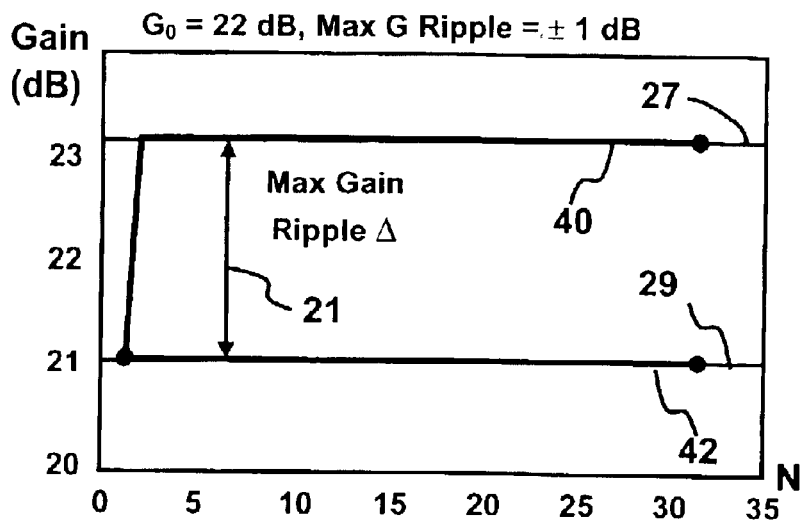
FIG. 4 illustrates a dependence of gain of two individual channels versus the number of channels that carry a signal in the apparatus for controlling an amplifier of the first embodiment under the same conditions as specified in FIG. 3.

A method of controlling an amplifier according to the first embodiment of the invention is illustrated in FIG. 4. The controlling is performed so that the gain of the lowest gain channel that carries a signal is monitored by the channel power monitors 16 and 18 and maintained at a constant value: $G_{ripple\ min}=G_0-\Delta/2$ where $G_0$ is the original amplifier target gain and $\Delta$ is the maximum amplifier gain ripple. The gain of the channel is maintained at the constant value $G_{ripple\ min}$ either by adjusting the amplifier target gain $G_0$ through the feedback control loop 11 until the gain of the channel is correct, or by calculating and applying the exact amplifier target gain $G_0$ that would result in the correct channel gain. The latter is accomplished by identifying all optical channels over the band of wavelengths that carry a signal, calculating an average gain $G_{avg}$ of said channels that carry a signal, calculating a gain difference $G_{diff}$ between the gain of the lowest gain channel that carries a signal, and the value $G_{ripple\ min}$, and changing the target gain of the amplifier so as to be substantially equal or equal to the following value: $G_{target}=G_{avg}+G_{diff}$.

Due to the accuracy of the AGC of the amplifier and the channel power monitors 16 and 18, there may be a discrepancy between the actual gain of the amplifier 12 and the target gain value $G_0$. As well, for reasons of convenience, it is possible to define a target range rather than a target value for the target gain $G_0$ of the amplifier. In such cases, the gain of the amplifier is said to be substantially equal to the target gain $G_0$.

This first embodiment is a simple implementation of the control of the amplifier that guarantees no gain excursion as is illustrated in FIG. 4. FIG. 4 illustrates a dependence of gain of two individual channels versus the number of channels that carry a signal in the apparatus for controlling an amplifier of the first embodiment under the same conditions as specified in FIG. 3 that cause maximal gain excursion. In FIG. 4, the gain $G_1$ of channel 1 $\lambda_1$ 42 remains constant at $G_0-\Delta/2$ because channel 1 is the lowest gain channel that will ever carry a signal. The gain $G_{32}$ of channel 32 $\lambda_{32}$ 40 does not remain constant. When only the channel 32 $\lambda_{32}$ 40 carries a signal, the gain $G_{32}$ of the channel 32 $\lambda_{32}$ 40 is $G_0-\Delta/2$. When the lowest gain channel 1 $\lambda_1$ starts to carry a signal, the gain $G_1$ of the channel 1 is also $G_0-\Delta/2$, and the gain $G_{32}$ of the channel 32 $\lambda_{32}$ increases to $G_0+\Delta/2$. Thus, comparing FIG. 4 with FIG. 3, it is seen that gain excursion 34 and 36 are eliminated.

Figure 5:
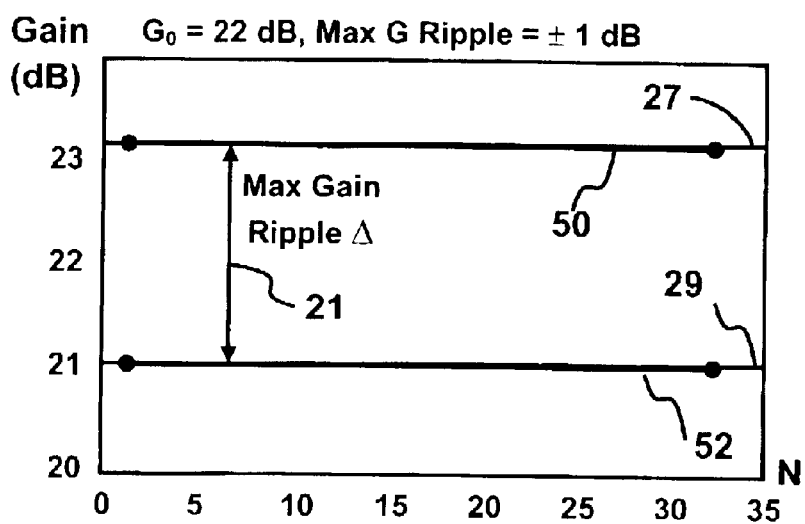
FIG. 5 illustrates a dependence of gain of two individual channels versus the number of channels that carry a signal in the apparatus for controlling an amplifier according to a modification of the first embodiment and under the same conditions as specified in FIG. 3.

In a modification to the method of the first embodiment, illustrated in FIG. 5, the controlling of the amplifier is performed so that the gain of the lowest gain channel is monitored by the channel power monitors 16 and 18 and maintained at a constant value: $G_{ripple\ min}=G_0-\Delta/2$ where $G_0$ is the original amplifier target gain, and $\Delta$ is the maximum amplifier gain ripple.

This implementation also guarantees no gain excursion, and in addition it guarantees constant channel gain for all channels as is illustrated in FIG. 5 and will be explained below. It does however require re-calculation, based on the amplifier spectral gain profile, of the target gain for a channel that carries a signal because the lowest gain channel does not necessarily carry a signal and thus cannot always be monitored. Recalculation is accomplished by calculating a gain difference $G_{diff}$ between the channel that has the lowest gain and the channel that carries a signal, and changing the target gain of the amplifier so as to provide that the gain of the channel that carries a signal is substantially equal or equal to the following value: $G_{recalculated} = G_0 - \Delta/2 + G_{diff}$, where $G_0$ is an original target gain of the amplifier, and $\Delta$ is the gain ripple. Recalculating the channel gain is not necessary if the lowest gain channel does carry a signal and thus can be monitored. Providing that the gain of the channel that carries a signal is substantially equal or equal to $G_{recalculated}$ is accomplished by identifying all optical channels over the band of wavelengths that carry a signal, calculating an average gain $G_{avg}$ of said channels, calculating a gain difference $\tilde{G}_{diff}$ between the gain of the channel identified above that carries a signal, and the value $G_{recalculated}$, and changing the target gain of the amplifier so as to be substantially equal or equal to the following value: $G_{target} = G_{avg} + \tilde{G}_{diff}$.

FIG. 5 illustrates a dependence of gain of two individual channels versus the number of channels that carry a signal in the apparatus for controlling an amplifier according to the modification of the first embodiment under the same conditions as specified in FIG. 3 that cause maximal gain excursion. In FIG. 5, the gain $G_1$ of channel $1(\lambda_1)$ 52 remains constant at $G_0 - \Delta/2$ because channel $1$ ($\lambda_1$) is the lowest gain channel. Channel $32$ $\lambda_{32}$ 50 remains constant at $G_0 + \Delta/2$ because the recalculation described above of the condition that $G_1 = G_0 - \Delta/2$ results now in the condition that $G_{32} = G_0 + \Delta/2$. Comparing FIG. 5 with FIG. 3, we see that gain excursions 34 and 36 are also eliminated.

Thus a method and apparatus for controlling an optical amplifier are provided, which are simple and guarantee no channel gain excursion.

Figure 6:
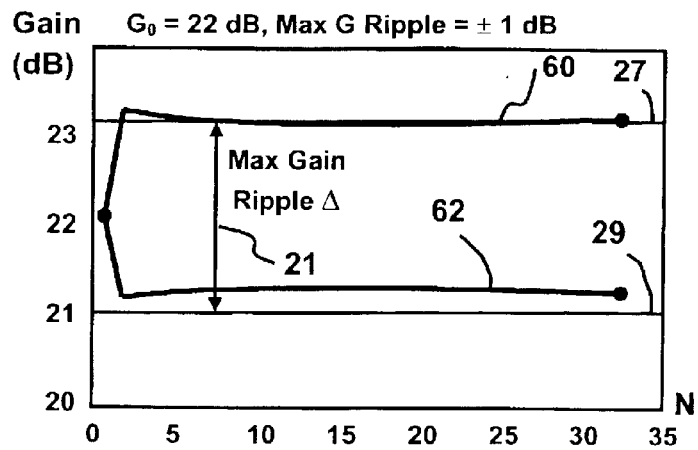
FIG. 6 illustrates a dependence of gain of two individual channels versus the number of channels that carry a signal in the apparatus for controlling an amplifier of the second embodiment under the same conditions as specified in FIG. 3.

A method for controlling an amplifier according to a second embodiment is illustrated in FIG. 6 and FIG. 7. The controlling is performed so that the gain g, of each of the channels that carry a signal is monitored by the channel power monitors 16 and 18, a weight $w_i$ is assigned to each of the said channels, and a weighted-average gain value $G_{weighted\ avg}$ is dynamically calculated by the controller 14 and supplied to the AGC amplifier 12 as a new amplifier target gain value $G_0$.

The number of channels that carry a signal $N_{populated\ channels}$ is provided by the channel power monitors 16 and 18. The total number of channels $N_{ch}$ and the assignment of the weight $w_i$ of each channel are provided by the controller 14.

The procedure for calculating the weighted-average gain value $G_{weighted\ avg}$ comprises identifying all optical channels over the band of wavelengths that carry a signal, determining the number of said channels $N_{populated\ channels}$, determining the gains $g_i$ for each of said channels, normalizing the weights such that $$\sum_{1}^{N_{ch}} w_i = 1,$$

and calculating the weighted-average gain as follows:

$$G_{weighted\ avg} = \left[\sum_{i=populated\ channels} g_i \cdot w_i\right] \frac{N_{ch}}{N_{populated\ channels}}$$

where $g_i$ and $w_i$ are the channel gain and channel weight for channel i, and $N_{ch}$ and $N_{populated\ channels}$ are the number of total channels and the number of channels that carry a signal respectively.

Figure 7A:
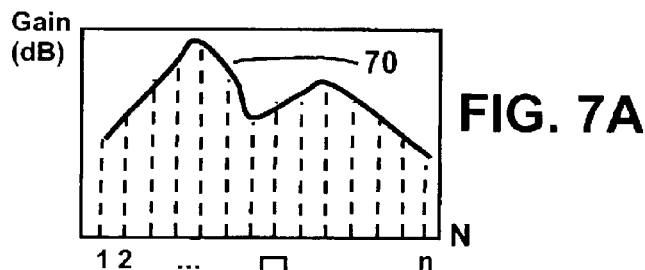
FIG. 7 illustrates the steps of generating weights for each of the individual channels in the method and apparatus for controlling an amplifier of the second embodiment of the invention.
Figure 7B:
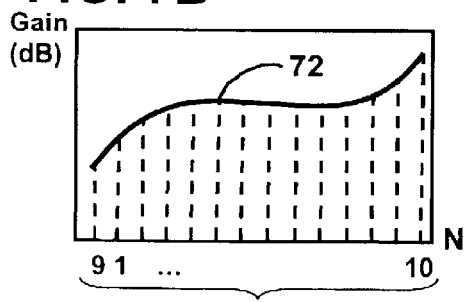

The weights $w_i$ of each of the channels are selected so as to complement the original gain spectrum. A procedure for generating such weights in the apparatus for controlling an amplifier of the second embodiment is illustrated in FIG. 7 and is described as follows. Initially, the amplifier has a nonlinear spectral gain profile 70 as shown in FIG. 7A, wherein the gain of the amplifier is plotted against the channel number of each of the channels within the amplification range.

1. Sort all channels within the amplification range by ascending gain. The result is a new ascending gain spectrum (profile) with ascending channel order 74 (9,1, . . . 10) as its argument shown in shown in FIG. 7B.

Figure 7C:
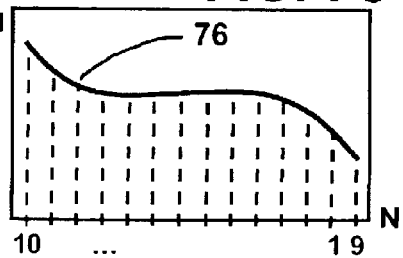

2. Sort all channels within the amplification range by descending gain. The result is a new descending gain spectrum (profile) 76 with monotonically decreasing normalized gain as shown in FIG. 7C and a descending channel order (10, . . . 1,9) as its argument.

3. Normalize the descending gain spectrum (profile) such that $$\tilde{g}_i = \frac{g_i}{\sum g_i}.$$

Figure 7D:
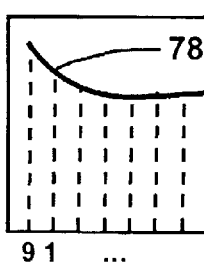

4. Form a weight profile 78 by taking the normalized descending gain profile 76 of Step 2 above, in which the ascending channel order (9,1, . . . , 10) is used as its argument as shown in FIG. 7D and determining corresponding weights $w_i$ for the channels from the weight profile.

Thus, the weights $w_i$ that are assigned to the channels are in exact reversal to the amplifier gain distribution.

5. For optimum performance, adjust the relative weight distribution or the tilt of the weights $w_i$ 78 by multiplying the weights $w_i$ 78 from Step 4 by the following weight-adjusting function:

$$f(\lambda) = c(\lambda - \lambda_c) + w_{avg}$$

where $\lambda_c$ is the centre wavelength, $w_{avg}$ is the average weight, and "c" is a negative constant for adjusting the weight distribution. Then normalize the weights such that:

$$\sum_{k=1}^{N_{ch}} w_k = 1.$$

FIG. 6 illustrates a dependence of gain of two individual channels versus the number of channels that carry a signal in the apparatus for controlling an amplifier of the second embodiment under the same conditions as specified in FIG. 3 that cause maximal gain excursion. In FIG. 6, the gain excursion of channel $1$ $\lambda_1$ 62 has been eliminated and that of channel $32$ $\lambda_{32}$ 60 has been significantly reduced.

Thus, a method of controlling an amplifier is provided which minimizes target gain variation and channel gain excursion.

In a modification to the method of the second embodiment, the controlling of the amplifier is performed so that another weighted-average gain value $\tilde{G}_{weighted\ avg}$ is dynamically calculated and supplied to the AGC amplifier as a new amplifier target gain value $G_0$. The weighted-average gain value $G_{weighted\ avg}$ is defined as follows:

$$\tilde{G}_{weighted\ avg} = \left[ \sum_{i=populated\ channels} g_i \cdot \tilde{w}_i \right]$$

where $g_i$ is the channel gain for channel i, and $\tilde{w}_i$ is defined as follows:

$$\tilde{w}_i = \frac{w_i}{\sum_{k=populated\ channels} w_k}$$

where $w_i$ is the channel weight for channel i and the weights $\tilde{w}_i$ are normalized:

$$\sum_{i=populated\ channels} \tilde{w}_i = 1$$

It is understood that other suitable methods of generating weights $w_i$ are also possible as long as the weights $w_i$ are normalized and they produce a minimization or elimination of channel gain excursion.

It is also understood that the steps of the methods for controlling an amplifier as described above may be applied to an end-to-end link to control an optical link rather than a specific amplifier. This could reduce the required hardware as the higher level feedback control loop is applied over a series of amplifiers rather than to each one. Also, the accumulated channel gain excursion over an end-to-end link is larger than for one amplifier and thus requires less precise control over its correction.

In a further modification to the above embodiments, the apparatus for controlling the amplifier may comprise means for performing the above methods which are integrated into the internal amplifier AGC 12 rather than on a higher level feedback control loop 11. This would simplify the design of the apparatus and eliminate redundant components, such as the total power monitors in the automatic gain controlled amplifiers since the channel power monitors provide all necessary measurements. Optionally, the amplifier 12, the controller 14 and channel monitors 16 and 18 may be integrated into a package, with other opto-electronic components if required.

It is apparent to those skilled in the art that there are many variations of the present invention that retain the spirit of the invention. Thus it is intended that the present invention cover the modifications, variations, and adaptations of this invention provided they fall within the scope of the following claims.

What is claimed is:

1. A method for monitoring and controlling an optical amplifier, comprising the steps of:
   determining a gain of an optical channel of the plurality of optical channels to be amplified in the amlifier;
   selecting a sub-set of optical channels from the plurality of optical channels; and
   dynamically regulating a target gain of the amplifier in response to the changes of the gain of said optical channel of the plurality of optical channels so as to provide that the gain for each optical channel from the selected sub-set of channels is within a predetermined range;
   wherein the step of dynamically regulating the target gain of the amplifier comprises regulating the target gain of the amplifier so as to provide that the gain for each channel from the selected sub-set of channels is within a gain ripple Δ of the amplifier, the gain ripple Δ being a variation of the amplifier gain profile within a band of wavelengths to be amplified; and
   wherein the step of dynamically regulating the target gain of the amplifier further comprises:
   (a) identifying an optical channel over the band of wavelengths that carries a signal and has the lowest gain; and
   (b) changing the target gain of the amplifier so as to provide that the gain of said channel is substantially equal to the following value $G_{ripple\ min}=G_0-\Delta/2$, wherein $G_0$ is an original target gain of the amplifier.

2. A method as described in claim 1, wherein the step (b) of changing the target gain comprises changing the target gain so as to provide that the gain of said channel is equal to $G_{ripple\ min}$.

3. A method as described in claim 1, further comprising:
   (c) identifying all optical channels over the band of wavelengths that carry a signal;
   (d) calculating an average gain $G_{avg}$ of said channels that carry a signal;
   (e) calculating a gain difference: $G_{diff}=G_{ripple\ min}-G_{min\ sig}$, wherein $G_{min\ sig}$ is the gain of the channel that carries a signal and has the lowest gain, the steps (c), (d), and (e) being performed before step (b); and
   wherein the step (b) comprises the step of (f) changing the target gain of the amplifier so as to be substantially equal the following value: $G_{target}=G_{avg}+G_{diff}$.

4. A method as described in claim 3, wherein the step (f) of changing the target gain comprises changing the target gain so as to be equal to $G_{target}$.

5. A method as described in claim 1, wherein the step of dynamically regulating the target gain of the amplifier further comprises:
   (a) identifying an optical channel over the band of wavelengths that has the lowest gain;
   (b) identifying an optical channel over the band of wavelengths that carries a signal;
   (c) calculating a gain difference: $G_{diff}=G_{sig}-G_{min\ gain}$, wherein $G_{min\ gain}$ is the channel that has the lowest gain and $G_{sig}$ is the channel that carries a signal identified in (b); and
   (d) changing the target gain of the amplifier so as to provide that the gain of the channel that carries a signal is substantially equal to the following value: $G_{recalculated}=G_0-\Delta/2+G_{diff}$, wherein $G_0$ is an original target gain of the amplifier.

6. A method as described in claim 5, wherein the step (d) of changing the target gain comprises changing the target gain so as to provide that the gain of said channel is equal to $G_{recalculated}$.

7. A method as described in claim 5, further comprising:
   (e) identifying all optical channels over the band of wavelengths that carry a signal;
   (f) calculating an average gain $G_{avg}$ of said channels;
   (g) calculating a gain difference $\tilde{G}_{diff}=G_{recalculated}-G_{sig}$, the steps (e), (f), and (g) being performed before step (d); and wherein the step (d) comprises the step of (h) changing the target gain of the amplifier so as to be substantially equal to the following value:

$$G_{target} = G_{avg} + \tilde{G}_{diff}.$$

8. A method as described in claim 7, wherein the step (h) of changing the target gain comprises changing the target gain so as to be equal to $G_{target}$.

9. A method as described in claim 1, wherein the step of dynamically regulating the target gain of the amplifier further comprises:
identifying all optical channels over the band of wavelengths that carry a signal, including determining the number of said channels $N_{populated\ channels}$ and determining the gains $g_i$ for each of said channels;
calculating weights $w_i$ for said channels, such that $$\sum_{1}^{N_{ch}} w_i = 1,$$

wherein $N_{ch}$ is the total number of optical channels to be amplified by the amplifier; and
changing the target gain of the amplifier so as to be substantially equal to the following value:

$$G_{weighted\ avg} = \left[\sum_{i=signal\ channels} g_i \cdot w_i\right] \frac{N_{ch}}{N_{signal\ channels}},$$

wherein $N_{ch}$ is the total number of optical channels to be amplified by the amplifier.

10. A method as described in claim 9, wherein the step of changing the target gain comprises changing the target gain so as to be equal to $G_{weighted\ average}$.

11. A method as described in claim 1, wherein the step of dynamically regulating the target gain of the amplifier further comprises:
identifying all optical channels over the band of wavelengths that carry a signal, including determining the gains $g_i$ for each of said channels and calculating weights $w_i$ of said channels; and
changing the target gain of the amplifier so as to be substantially equal to the following value:

$$\tilde{G}_{weighted\ avg} = \left[\sum_{i=signal\ channels} g_i \cdot \tilde{w}_i\right],$$

wherein $$\tilde{w}_i = \frac{w_i}{\sum_{k=signal\ channels} w_k}$$

such that $$\sum_{i=signal\ channels} \tilde{w}_i = 1.$$

12. A method as described in claim 11, wherein the step of changing the target gain comprises changing the target gain so as to be equal to $\tilde{G}_{weighted\ avg}$.

13. A method as described in claim 9, wherein the step of calculating the weights comprises:
sorting the optical channels over the band of wavelengths by ascending gain to form an ascending gain profile, which has an ascending channel order as its argument;
sorting the optical channels over the band of wavelengths by descending gain to form a descending gain profile, which has a descending channel order as its argument;
normalizing the descending gain profile such that $$g'_i = \frac{g_i}{\sum g_i};$$

and
forming a weight profile as the normalized descending gain profile in which the ascending channel order is used as its argument; and
determining the weights for the channels from the weight profile.

14. A method as described in claim 13, further comprising:
calculating an average $w_{avg}$ of the weights;
calculating a center wavelength $\lambda_c$ in the band of wavelengths;
multiplying the weights by the following weight-adjusting function:
$\theta(\lambda) = c(\lambda - \lambda_c) + w_{avg}$, wherein c is a negative constant for adjusting the weight distribution; and
normalizing the weights such that $$\sum_{1}^{N_{ch}} w_i = 1.$$

15. A method as described in claim 11, wherein the step of calculating the weights comprises:
sorting the optical channels over the band of wavelengths by ascending gain to form an ascending gain profile, which has an ascending channel order as its argument;
sorting the optical channels over the band of wavelengths by descending gain to form a descending gain profile, which has a descending channel order as its argument;
normalizing the descending gain profile such that $$g'_i = \frac{g_i}{\sum g_i};$$

and
forming a weight profile as the normalized descending gain profile in which the ascending channel order is used as its argument; and
determining the weights for the channels from the weight profile.

16. A method as described in claim 15, wherein the step of calculating the weights further comprises:
calculating an average $w_{avg}$ of the weights;
calculating a center wavelength $\lambda_c$ in the band of wavelengths;
multiplying the weights by the following weight-adjusting function:
$f(\lambda) = c(\lambda - \lambda_c) + w_{avg}$, wherein c is a negative constant; and
normalizing the weights such that $$\sum_{1}^{N_{ch}} w_i = 1.$$

17. An apparatus for monitoring and controlling performance of an optical network, comprising:
an amplifier for amplifying a plurality of optical channels, the amplifier having an input and an output;

an input channel power monitor for monitoring an input power of an optical channel at the input of an amplifier;

an output channel power monitor for monitoring an output power of said optical channel at the output of the amplifier; and a controller having means for receiving data from the input and output channel power monitors and means for dynamically regulating a target gain of the amplifier in response to said data so as to provide that a gain for each channel within a selected sub-set of channels out of the plurality of channels to be amplified is within a predetermined range;

wherein the means for dynamically regulating the target gain comprises means for dynamically regulating the target gain of the amplifier so as to provide that the gain for each channel within a selected sub-set of channels out of a plurality of channels to be amplified in the amplifier is within a gain ripple of the amplifier, the gain ripple $\Delta$ being a variation of the amplifier gain within a band of wavelengths to be amplified; and wherein the means for dynamically regulating the target gain further comprises:

(a) means for identifying an optical channel over the band of wavelengths that carries a signal and has the lowest gain; and (b) means for changing the target gain of the amplifier so as to provide that the gain of said channel is one of the substantially equal and equal to the following value: $G_{ripple\ min}=G_0-\Delta/2$, wherein $G_0$ is an original target gain of the amplifier.

18. An apparatus as described in claim 17, further comprising:

(c) means for identifying all optical channels over the band of wavelengths that carry a signal;

(d) means for calculating an average gain $G_{avg}$ of said channels that carry a signal;

(e) means for calculating a gain difference: $G_{diff}=G_{ripple\ min}-G_{min\ sig}$, wherein $G_{min\ sig}$ is the gain of the channel that carries a signal and has the lowest gain; and wherein the means (b) for changing the target gain further comprises means (f) for changing the target gain of the amplifier so as to be one of the substantially equal and equal to the following value: $G_{target}=G_{avg}+G_{diff}$.

19. An apparatus as described in claim 17, wherein the means for dynamically regulating the target gain comprises:

(a) means for identifying an optical channel over the band of wavelengths that has the lowest gain;

(b) means for identifying an optical channel over the band of wavelengths that carries a signal;

(c) means for calculating a gain difference: $G_{diff}=G_{sig}-G_{min\ gain}$, wherein $G_{min\ gain}$ is the channel that has the lowest gain and $G_{sig}$ is the channel that carries a signal identified in (b); and (d) means for changing the target gain of the amplifier so as to provide that the gain of the channel that carries a signal is one of the substantially equal and equal to the following value: $G_{recalculated}=G_0-\Delta/2+G_{diff}$, wherein $G_0$ is an original target gain of the amplifier.

20. An apparatus as described in claim 19, further comprising:

(e) means for identifying all optical channels over the band of wavelengths that carry a signal;

(f) means for calculating an average gain $G_{avg}$ of said channels;

(g) means for calculating a gain difference: $\tilde{G}_{diff}=G_{recalculated}-G_{sig}$; and wherein the means (d) for changing the target gain further comprises means (h) for changing the target gain of the amplifier so as to be one of the substantially equal and equal to the following value: $G_{target}=G_{avg}+\tilde{G}_{diff}$.

21. An apparatus as described in claim 17, wherein the means for dynamically regulating the target gain further comprises:

means for identifying all optical channels over the band of wavelengths that carry a signal, including means for determining the number of said channels $N_{populated\ channels}$ and means for determining the gains $g_i$ for each of said channels;

means for calculating weights $w_i$ for said channels, such that $$\sum_{1}^{N_{ch}} w_i = 1,$$

wherein $N_{ch}$ is the total number of optical channels to be amplified by the amplifier; and means for changing the target gain of the amplifier so as to be one of the substantially equal and equal to the following value:

$$G_{weighted\ avg} = \left[\sum_{i=populated\ channels} g_i \cdot w_i\right] \frac{N_{ch}}{N_{populated\ channels}},$$

wherein $N_{ch}$ is the total number of optical channels to be amplified by the amplifier.

22. An apparatus as described in claim 17, wherein the means for dynamically regulating the target gain further comprises:

means for identifying all optical channels over the band of wavelengths that carry a signal including means for determining the gains $g_i$ for each of said channels and means for calculating weights $w_i$ of said channels; and means for changing the target gain of the amplifier so as to be one of the substantially equal and equal to the following weighted-average gain value:

$$\tilde{G}_{weighted\ avg} = \left[\sum_{i=signal\ channels} g_i \cdot \tilde{w}_i\right] \text{ wherein } \tilde{w}_i = \frac{w_i}{\sum_{k=signal\ channels} w_k} \text{ such that } \sum_{i=signal\ channels} \tilde{w}_i = 1.$$

23. An apparatus as described in claim 21, wherein the means for calculating the weights comprises:

means for sorting the optical channels over the band of wavelengths by ascending gain to form an ascending gain profile, which has an ascending channel order as its argument;

means for sorting the optical channels over the band of wavelengths by descending gain to form a descending gain profile, which has a descending channel order as its argument;

means for normalizing the descending gain profile such that $$g'_i = \frac{g_i}{\sum g_i};$$

and means for forming a weight profile as the normalized descending gain profile in which the ascending channel order is used as its argument and for determining the weights for the channels from by the weight profile.

24. An apparatus as described in claim 23, further comprising:
means for calculating an average $w_{avg}$ of the weights;
means for calculating a center wavelength $\lambda_c$ in the band of wavelengths;
means for multiplying the weights by the following weight-adjusting function: $f(\lambda)=c(\lambda-\lambda_c)+w_{avg}$, wherein c is a negative constant for adjusting the weight distribution; and
means for normalizing the weights such that $$\sum_1^{N_{ch}} w_i = 1.$$

25. An apparatus as described in claim 22, wherein the means for calculating the weights comprises:
means for sorting the optical channels over the band of wavelengths by ascending gain to form an ascending gain profile, which has an ascending channel order as its argument;
means for sorting the optical channels over the band of wavelengths by descending gain to form a descending gain profile, which has a descending channel order as its argument;
means for normalizing the descending gain profile such that $$g'_i = \frac{g_i}{\sum g_i};$$

and means for forming a weight profile as the normalized descending gain profile in which the ascending channel order is used as its argument and for determining the weights for the channels from by the weight profile.

26. An apparatus as described in claim 25, further comprising:
means for calculating an average $w_{avg}$ of the weights;
means for calculating a center wavelength $\lambda_c$ in the band of wavelengths;
means for multiplying the weights by the following weight-adjusting function: $\theta(\lambda)=c(\lambda-\lambda_c)+w_{avg}$, wherein c is a negative constant for adjusting the weight distribution; and
means for normalizing the weights such that $$\sum_1^{N_{ch}} w_i = 1.$$

* * * * *

UNITED STATES PATENT AND TRADEMARK OFFICE
CERTIFICATE OF CORRECTION

PATENT NO. : 6,903,867 B2
APPLICATION NO. : 10/195495
DATED : June 7, 2005
INVENTOR(S) : E. K. H. Ng et al.

Page 1 of 1

It is certified that error appears in the above-identified patent and that said Letters Patent is hereby corrected as shown below:

Column 16, line 2, " $g'_i = \frac{g_i}{\sum g_i}$ " is corrected to read as -- $g_i' = \frac{g_i}{\sum g_i}$ --.

Column 16, line 20, "$\theta(\lambda) = c(\lambda - \lambda_c)$" is corrected to read as --$f(\lambda) = c(\lambda - \lambda_c)$--.

Column 16, line 40, " $g'_i = \frac{g_i}{\sum g_i}$ " is corrected to read as -- $g_i' = \frac{g_i}{\sum g_i}$ --.

Column 19, line 1, " $g'_i = \frac{g_i}{\sum g_i}$ " is corrected to read as -- $g_i' = \frac{g_i}{\sum g_i}$ --.

Column 20, line 7, " $g'_i = \frac{g_i}{\sum g_i}$ " is corrected to read as -- $g_i' = \frac{g_i}{\sum g_i}$ --.

Column 20, line 22, "$\theta(\lambda) = c(\lambda - \lambda_c)$" is corrected to read as --$f(\lambda) = c(\lambda - \lambda_c)$--.

Signed and Sealed this

Sixteenth Day of September, 2008

JON W. DUDAS
*Director of the United States Patent and Trademark Office*